(12) United States Patent
Ballarini et al.

(10) Patent No.: US 8,344,099 B2
(45) Date of Patent: Jan. 1, 2013

(54) STEAMING OF A POLYOLEFIN

(75) Inventors: Giorgio Ballarini, Ferrara (IT); Antonio Mileo, Mercato San Severino (IT); Luca Soffritti, Pontelagoscuro (IT); Enrico Soffritti, legal representative, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 13/142,365

(22) PCT Filed: Dec. 23, 2009

(86) PCT No.: PCT/EP2009/067884
§ 371 (c)(1),
(2), (4) Date: Jul. 19, 2011

(87) PCT Pub. No.: WO2010/076285
PCT Pub. Date: Jul. 8, 2010

(65) Prior Publication Data
US 2012/0016098 A1  Jan. 19, 2012

Related U.S. Application Data

(60) Provisional application No. 61/204,942, filed on Jan. 13, 2009.

(30) Foreign Application Priority Data

Dec. 30, 2008  (EP) .................... 08173120

(51) Int. Cl.
C08C 2/06 (2006.01)
B01J 19/18 (2006.01)
(52) U.S. Cl. ...................................................... 528/500
(58) Field of Classification Search .................. 528/500
See application file for complete search history.

(56) References Cited

U.S. PATENT DOCUMENTS 4,332,933 A  6/1982  Di Drusco

FOREIGN PATENT DOCUMENTS

| EP | 0756883 | 2/1997 |
| EP | 0808850 | 11/1997 |
| EP | 1348721 A1 | 10/2003 |
| WO | WO-93/13843 | 7/1993 |
| WO | WO-00/63261 | 10/2000 |
| WO | WO-2008/080782 | 7/2008 |

*Primary Examiner* — Terressa Boykin
(74) *Attorney, Agent, or Firm* — Dilworth IP LLC

(57) ABSTRACT

A method for treating polymer particles with steam in a steaming vessel downstream a polymerization process, the method comprising contacting polymer particles with a counter-current flow of steam, wherein the flow rate of steam entering said steaming vessel is continuously maintained proportional to the production rate of said polymer in said polymerization process and to the gradient between the temperature ($T_{out}$) of the polymer exiting said steaming vessel and the temperature ($T_{in}$) of the polymer entering said steaming vessel.

11 Claims, 1 Drawing Sheet

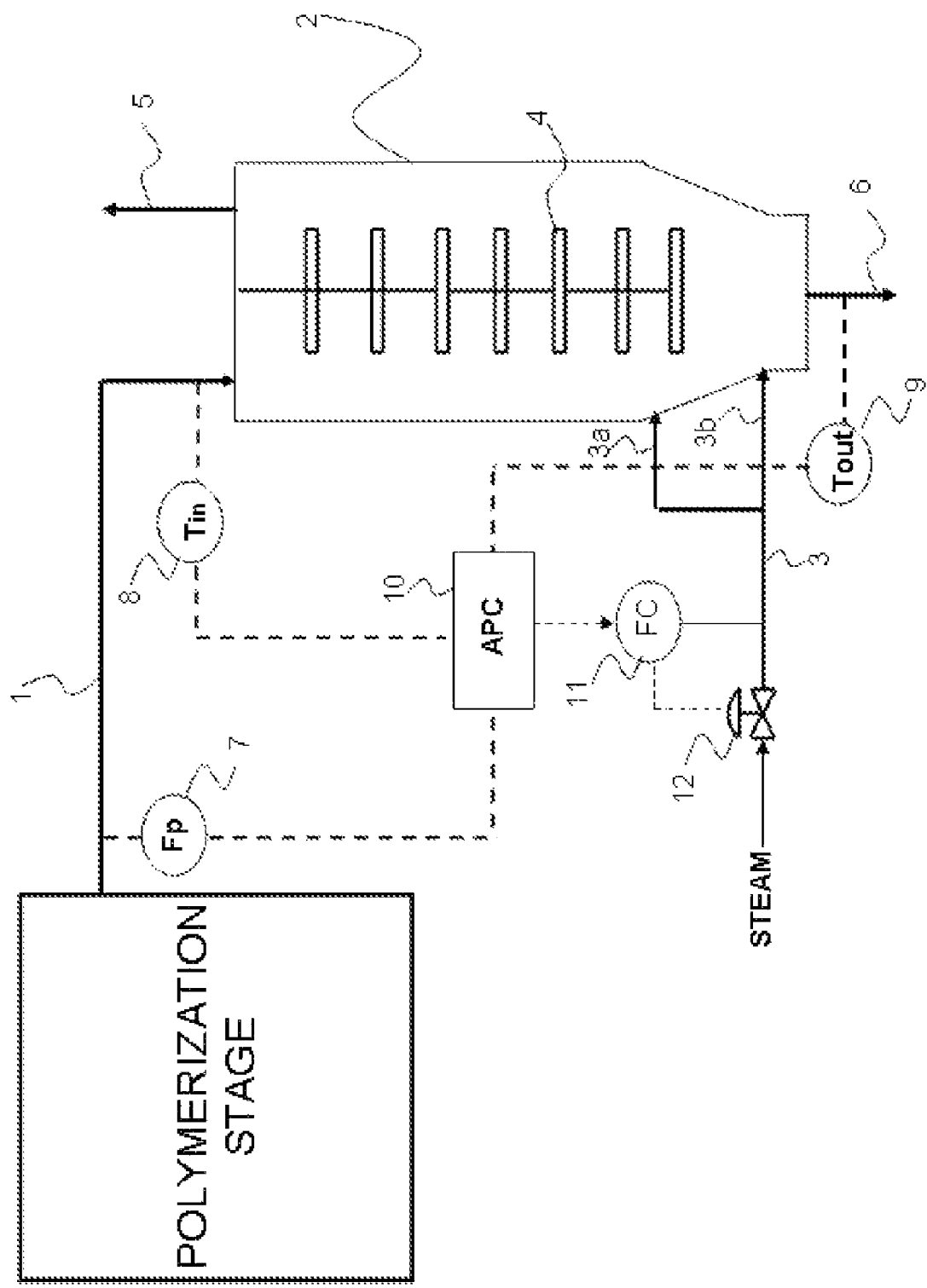

STEAMING OF A POLYOLEFIN

This application is the U.S. national phase of International Application PCT/EP2009/067884, filed Dec. 23, 2009, claiming priority to European Patent Application 08173120.0 filed Dec. 30, 2008, and the benefit under 35 U.S.C. 119(e) of U.S. Provisional Application No. 61/204,942, filed Jan. 13, 2009; the disclosures of International Application PCT/EP2009/067884, European Patent Application 08173120.0 and U.S. Provisional Application No. 61/204,942, each as filed, are incorporated herein by reference.

The present invention relates to steaming of polymer particles coming from an olefin polymerization process, in particular to the treatment of a polyolefin by operating a continuous control on the feed of steam which contacts said polyolefin.

The use of catalysts with high activity and selectivity of the Ziegler-Natta type and, more recently, of the metallocene type has led to the widespread use on an industrial scale of processes in which the olefin polymerization is carried out in a liquid-phase or a gas-phase in the presence of a solid catalyst. A Ziegler-Natta catalyst comprises a solid catalytic component based on a transition metal compound, such as a titanium tetrachloride, and an organometallic compound acting as the catalyst activator, such as an aluminium alkyl compound. Several reactions for polymerizing different olefins may be catalyzed by a Ziegler-Natta catalyst, thus producing homopolymers, copolymers or terpolymers. The obtained polymers contain residues of catalyst components, a certain quantity of unreacted monomers and other volatile compounds.

Moreover, when the olefin polymerization is carried out in the gas-phase, the presence of inert gases, such as propane, isobutane, isopentane or other saturated aliphatic hydrocarbons, has mainly the function of contributing to dissipate the heat generated inside the reactor from the polymerization reaction. Even these alkanes of low volatility may remain occluded and dissolved in the polyolefins particles.

For safety, economical and ecological reasons, there is the need to remove the unreacted (co)monomers, the organic compounds and alkanes of relatively low volatility from the produced polyolefin. All these compounds constitute a load on the environment, some of them are capable of forming explosive mixtures in the presence of atmospheric oxygen. Unconverted monomers represent also a risk of prolongation of uncontrolled residual polymerization outside the polymerization reactor. Moreover, the removal of unreacted monomers from the polymer allows their recovery and recycle to the polymerization reactor, thus saving the consumption of raw materials.

The removal of the above volatile compounds from the polymer is also necessary to obtain high quality polymer granules to be subjected to extrusion and pelletization, and also because the presence of such compounds into the polymers requires higher safety precautions for the downstream processes. Some catalyst components might react with air, water and additives, also with violent reactions, forming dangerous compounds, and possibly affecting the odor and the color of the obtained polymeric products.

A finishing step to remove from the polymer particles unreacted (co)monomers, organic compounds, inert gases, and catalyst residues, is typically part of a polymerization process. EP 0 808 850 and EP 1 348 721 disclose methods for reducing the odor development in olefin polymers obtained by polymerization reactions catalyzed by means of metallocene catalysts. According to the teaching of these patents the ligands having a cyclopentadienyl skeleton are sources of odor development. Said ligands can be efficiently removed by a method including a step of contacting the polyolefin with water to decompose the residual ligands contained in the polyolefin, and then a step of removing the decomposed ligands by heating said polyolefin in a stream of inert gas, preferably nitrogen.

U.S. Pat. No. 4,332,933 describes a method for treating a polymer powder to reduce its content of catalyst residues and volatile compounds. This method comprises flowing a stream of superheated steam at a temperature from 105 to 140° C. over the polymer powder, and maintaining the polymer at said temperatures, so as to prevent any steam condensation. A stream of superheated steam is continuously introduced at the bottom of a vessel containing the polymer particles in fluidized conditions. The heat required to increase the temperature of the polymer to the temperature of 105-140° C. is supplied to the system by suitable heat exchangers immersed in the fluidized polymer bed. Furthermore, the vessel walls are heated by external jackets in order to prevent the steam condensation.+

WO 2008/080782 discloses a process for polyolefin finishing comprising a step in which a polyolefin is treated with steam followed by a step in which the steam-treated polyolefin is dried. In the first step a polyolefin discharged from a polymerization reactor is fed to the top of a vessel in which it is treated with a counter-current flow of saturated steam that performs a stripping of gases associated to the polyolefin and deactivates catalyst residues. The steam-treated polyolefin is discharged from the bottom of the vessel and transferred to another vessel in which a drying step is performed. Contact of saturated steam with the polyolefin contributes to heat the polyolefin particles and causes condensation of steam, so that a layer of water is formed on the polyolefin particles. The amount of steam fed to the bottom of the vessel exceeds the amount of steam that undergoes condensation, so that a portion of the steam introduced into the vessel remains as a gas-phase.

The main disadvantage of the above described prior art processes resides in that the flow rate of steam is usually maintained constant independently from the reactor production rate. However, it is well known to the person skilled in that art that the productivity of a polymerization reactor is subjected to continuous variations along the time. In fact, eventual fluctuations on the operating conditions in the reactor (temperature, pressure, monomers concentration, catalyst activity) can considerably increase or decrease the production rate of the polymer discharged from the polymerization reactor. As a consequence, maintaining a constant flow rate of steam during the polymer steaming may lead to a waste of steam in case the reactor productivity decreases or, on the contrary, to insufficient stripping of the monomers in case the reactor productivity increases.

In view of the above, it would be highly desirable to overcome the above described drawbacks associated with the use of a constant flow rate of steam when treating polyolefin particles inside a steaming vessel.

It is therefore an object of the present invention a method for treating polymer particles with steam in a steaming vessel downstream a polymerization process, the method comprising contacting polymer particles with a counter-current flow of steam, wherein the flow rate of steam entering said steaming vessel is continuously maintained proportional to the production rate of said polymer in said polymerization process and to the gradient between the temperature ($T_{out}$) of the polymer exiting said steaming vessel and the temperature ($T_{in}$) of the polymer entering said steaming vessel.

The main advantage of the method of present invention is that the amount of steam used to perform the polymer steaming is suitably adjusted in correlation with the polymer amount entering the steaming vessel. The amount of steam is also depending on the level of heating to which the polymer is subjected when passing through the steaming vessel.

In synthesis, the method of the invention allows to achieve an efficient removal of unreacted monomers and heavy hydrocarbons from polymer particles coming from a polymerization reactor, while optimizing the amount of steam continuously introduced into the steaming vessel.

The method of the invention is suitable for treating a polymer which is counter-currently contacted with a flow of steam, in such a way that the polymer particles are introduced in the upper portion of the steamer and fall down by gravity counter-currently contacting a flow of steam introduced at the bottom of the steamer. Preferably the polymer particles descend through the steaming vessel under "plug flow" conditions.

According to the invention, the suitable amount of steam to be fed to the steaming vessel is adjusted as a function of the flow rate Fp of the polymer introduced into said vessel, and as a function of the difference $\Delta T_{polymer}$ between the outlet temperature ($T_{out}$) and the inlet temperature ($T_{in}$) of the polymer in said steaming vessel.

In particular, the method of the invention comprises means for detecting the above parameters flow rate Fp, temperatures $T_{out}$, $T_{in}$ and control means for adjusting the flow rate of steam according to the value calculated by means of the following equation (I):

$$F_{steam} = K \cdot Fp \cdot \Delta T_{polymer} \quad (I)$$

wherein:
$F_{steam}$=flow rate (Kg/h) of steam entering the steaming vessel;
Fp=flow rate (Kg/h) of polymer introduced at the top of the steaming vessel;
$\Delta T_{polymer} T_{out} - T_{in}$ (° C.)
$K(° C.)^{-1}$=multiplicative constant of the steam flow rate The multiplicative constant K in the above equation (I) is a parameter depending on the specific heat of the polymer, and on the heat of condensation of the steam at the pressure maintained in the steamer. In case of super-heated steam, K is also depending on the specific heat of the steam.

In particular, the value of the multiplicative constant K results from the product K*·Ke, wherein:
K* depends on the specific heat of the polymer and on the heat of condensation of the steam at the pressure maintained in the steamer;
Ke=parameter taking into account the excess of steam with respect to the amount of steam theoretically needed just to heat the polymer from Tin to Tout.

The flow rate Fp of polymer entering the steaming vessel substantially corresponds to the instantaneous production rate of polymer which is continuously discharged from the polymerization reactor, since all the polymer coming from the reactor needs to be subjected to degassing and catalyst deactivation in the steaming vessel.

Eventual fluctuations on the operating conditions inside the reactor (temperature, pressure, monomers concentration, catalyst activity) can increase or decrease the polymer production rate, and accordingly also the value of Fp is subjected to variations in the time.

Also the temperature Tin of the polymer entering the steaming vessel may vary depending on the changes of process conditions inside the polymerization reactor and in the degassing stages usually performed upstream the polymer steaming. Depending on the type of polymer to be treated, the inlet temperature $T_{in}$ generally ranges from 60 to 95° C., preferably from 70 to 90° C.

The value of outlet temperature (Tout) of the polymer may be directly measured at the outlet of the steaming vessel. Alternatively, a pre-fixed reference temperature may be used for Tout in the above equation (I). Generally, Tout ranges from 80 to 120° C., preferably from 95 to 110° C.

When decreasing the reactor productivity the method of present invention allows advantageously to decrease the flow rate Fs of steam entering the steaming vessel. The same occurs when there is an increase of the inlet temperature Tin of the polymer into the steamer. In fact, a hotter polymer requires a lower amount of steam in order to heat the polymer and strip away the unreacted monomers. The method of the invention monitors continuously the values of the above parameters (Fp, $\Delta T_{polymer}$) and adjusts in continuous the flow rate Fs of steam introduced into the steamer, so that the use of unnecessary amounts of steam is avoided. On the contrary, when increasing the reactor productivity or decreasing the inlet temperature $T_{in}$, the method of the invention detects the above variations and increases suitably the amount of steam fed to the steaming vessel.

The control means for adjusting the flow rate of steam according to the invention comprise an advanced process controller (APC) including a software able to calculate the value of $F_{steam} = K \cdot Fp \cdot \Delta T_{polymer}$, and a flow rate controller (FC) able to act on the opening of a control valve, which adjusts the flow rate of steam entering the bottom of the steaming vessel. According to the invention, the adjustment of the steam flow rate is advantageously performed at short time intervals, for instance at time intervals of N minutes, with N ranging from 0.1 to 10 minutes, preferably from 0.3 to 5 minutes. More preferably the adjustment of steam flow rate is preset every minute (N=1). Therefore, every N minutes the flow rate of steam is recalculated by means of the above equation $F_{steam} = K \cdot Fp \cdot \Delta T_{polymer}$ and the above mentioned control means adjusts the steam flow rate according to the updated value.

The polymer treated according to the method of present invention is preferably a polyolefin, preferably an ethylene, a propylene or butene-1 (co)polymer.

Steam fed to the control valve before entering the steaming vessel is preferably a low-pressure steam (2-5 bar) at a temperature of 120-150° C. The absolute pressure inside the steaming vessel may range from 1 to 4 bar, preferably from 1.1 to 2.0 absolute bar.

At the operative temperatures maintained in the steaming vessel, the unreacted monomers are stripped away and the catalyst residues are deactivated by the steam in a short period of time. The great diffusivity of steam through the polymer and the plug flow conditions make the treatment efficient at residence times of the polymer comprised between 10 minutes and 45 minutes, preferably from 15 minutes to 35 minutes. Steam is withdrawn from the top of the steamer enriched with the removed gaseous organic compounds.

Preferably the method of the invention uses steam in saturated conditions. During the polymer steaming the saturated steam partially condenses on contact with the polymer particles, thus forming a layer of water thereon. Such a layer of water prevents from agglomeration of the polymer particles each other, so that also particularly sticky polymers may be efficiently subjected to steaming, without having polymer softening and agglomeration.

Of course, after the discharge from the steaming vessel the polymer particles need to be subjected to a drying step in order to remove away the steam/water form the polymer. The dried polyolefin coming from the drying step is therefore substantially free from moisture, volatile compounds and catalyst residues, and can be processed in subsequent processing operations.

The invention will be better understood and carried into effect with reference to the attached FIG. 1, which represents an illustrative and non-limiting embodiment of the invention.

In the embodiment shown in FIG. 1 polymer particles coming from a polymerization stage are conveyed via line 1 to the top of a steamer 2, wherein the polymer is counter-currently contacted with a flow of steam introduced via line 3 at the bottom of the steamer 2.

The feed of steam is distributed by means of two separate lines 3a and 3b, both arranged at the bottom portion of the steamer 2.

The polymer particles descend through the steamer 2 under "plug flow" conditions and in order to foster their downward flow the steamer 2 is equipped with a stirrer 4, which provides a mild rotation.

Steam is withdrawn via line 5 from the top of the steamer enriched with the removed gaseous organic compounds, while the degassed polymer is withdrawn via line 6 from the bottom of the steamer 2.

The method of the invention comprises the detecting means 7, 8, and 9, respectively useful to measure or calculate the flow rate of polymer Fp discharged from the polymerization stage, the inlet temperature $T_{in}$ of the polymer introduced into the steamer 2, and the outlet temperature $T_{out}$ of the polymer when exiting the bottom of the steamer 2.

The values of Fp, $T_{in}$ and $T_{out}$ are hence transmitted to an advanced process controller (APC) 10, which includes a software able to calculate the value of flow rate of steam according to the equation: $F_{steam} = K \cdot Fp \cdot (T_{out} - T_{in})$ The output value from the ACP 10 is transmitted to a flow rate controller (FC) 11, able to act on the opening of a regulation valve 12, so that the flow rate Fs of steam entering the steamer 2 via lines 3a, 3b is adjusted according to the input value coming from the flow rate controller 11 at preset intervals of time.

The following examples illustrate the invention without limiting its scope.

EXAMPLES

Example 1

Comparative

—Polymerization Conditions—

Polypropylene is produced by means of slurry polymerization of the liquid monomer in a loop reactor.

A Ziegler-Natta catalyst is used as the polymerization catalyst, comprising:
- a titanium solid catalyst component prepared with the procedure described in WO 00/63261, Example 10, according to which diethyl 2,3-diisopropyl-succinate is used as an internal donor compound;
- triethylaluminium (TEAL) as a cocatalyst;
- dicyclopentyldimethoxysilane as an external donor.

Propylene is polymerized in the loop reactor using $H_2$ as the molecular weight regulator. No comonomer is fed to this reactor. Make-up propylene and hydrogen are continuously fed to the loop reactor. The polymerization of propylene is carried out at a temperature of 70° C. and a pressure of 34 absolute bar.

The polypropylene slurry, continuously discharged from the loop reactor, is forced to flow inside a jacketed pipe wherein it is heated up to reach a temperature of 85° C. with consequent evaporation of the liquid phase. Successively the obtained stream of polypropylene and evaporated monomer is introduced in a flash tank, where part of the evaporated propylene is separated from the polymer particles.

—Steaming—

30000 Kg/h of polypropylene are conveyed via line 1 to the top of the steamer (reference 2 in FIG. 1). The average temperature of polymer particles at the inlet of the steamer 2 is of about 70° C.

Saturated steam is fed at the bottom of the steamer 2 via lines 3a, 3b with a total flow rate of steam equal to 2200 Kg/h. This total amount of saturated steam is maintained unchanged over the time, without performing the control method of present invention.

The polymer particles fall down by gravity along the steamer 2, thus contacting in a counter current the upward flow of saturated steam. The operative conditions are such to maintain in the steamer a temperature of 106° C. and a pressure of 1.2 absolute bar. The average residence time of the polymer in the steamer is of 20 minutes.

Steam enriched in gaseous hydrocarbons, mainly propylene and propane, is discharged from the top of the steamer 2 via line 5, while the steam treated polypropylene is withdrawn from the bottom of the steamer 2 via line 6 and conveyed to a drying step.

According to this example the amount of steam (2200 kg/h) fed to the steamer 2 is maintained unchanged over the time, not taking into account the eventual variations of the polymer production rate in the polymerization stage and the changes of polymer temperatures along the steamer 2 ($T_{in}$ and $T_{out}$). After 1 week the consumption of steam results of 369600 kg: with respect to the average polymer productivity (30 t/h) the amount of steam corresponds to 73 Kg of steam per 1000 kg of treated polyolefin.

Example 2

The polypropylene particles prepared according the polymerization conditions given in Example 1 are subjected to steaming according to the control method of present invention.

The polymerization conditions are such to have an average production rate of 30000 Kg/h, however the instantaneous value of polymer productivity fluctuates in the time around this average value.

The initial inlet temperature of the polymer into the steamer 2 of FIG. 1 is of 70° C., but this temperature varies slightly over time depending on the temperature at which the polymer is discharged from the polymerization reactor.

Saturated steam is fed to the bottom of the steamer 2 via lines 3a, 3b. The outlet temperature of the polymer is of 106° C., which is the temperature of saturated steam introduced at the bottom of the steamer 2 via lines 3a, 3b of FIG. 1.

The initial value of flow rate of steam fed to the steamer is of 2200 Kg/h, but successively the flow rate of steam is adjusted every one minute according to the following equation:

$$\text{Steam flow rate}(Kg/h) = K \cdot Fp(Kg/h) \cdot \Delta T_{polymer}$$

$K = K^* \cdot K^e$, wherein $K^*$ depends on the specific heat of the polymer, the heat of condensation of the steam:
$K^* = \{(Cp)_{polymer}/\text{Heat of condensation of Steam}\} = 1.08 \times 10^{-3}$
$K^e = 1.5$ (excess of steam with respect to the amount of steam theoretically needed just to heat the polymer from Tin to Tout)

Accordingly, K=1.5×{$(Cp)_{polymer}$/Heat of condensation of Steam}=1.5×1.08×10$^{-3}$
wherein: $(Cp)_{polymer}$=Average Specific Heat of polypropylene=0.58 kcal/kg °C.

Heat of condensation of Steam at 1.2 bar=536 Kcal/kg

After 1 week the consumption of steam results of 293933 kg. With respect to the average polymer productivity (30 t/h) the consumption of steam results to be equal to 58 Kg of steam per 1000 kg of treated polyolefin.

With respect to comparative Example 1 in one week the save on the amount of steam is of 20.5% by weight.

The invention claimed is:

1. A method for treating polymer particles with steam in a steaming vessel downstream a polymerization process, the method comprising contacting polymer particles with a counter-current flow of steam, wherein the flow rate of steam entering said steaming vessel is continuously maintained proportional to the production rate of said polymer in said polymerization process and to the gradient between the temperature ($T_{out}$) of the polymer exiting said steaming vessel and the temperature ($T_{in}$) of the polymer entering said steaming vessel.

2. A method for treating polymer particles with steam in a steaming vessel downstream a polymerization process, the method comprising contacting polymer particles with a counter-current flow of steam, wherein the flow rate of steam entering said steaming vessel is continuously maintained proportional to the production rate of said polymer in said polymerization process and to the gradient between the temperature ($T_{out}$) of the polymer exiting said steaming vessel and the temperature ($T_{in}$) of the polymer entering said steaming vessel, wherein the method comprises:
means for detecting said polymer production rate, said outlet temperature $T_{out}$ and said inlet temperature $T_{in}$,
control means for adjusting said flow rate of steam according to the value calculated by means of the equation $F_{steam}=K\cdot Fp\cdot \Delta T_{polymer}$, wherein:
$F_{steam}$=flow rate (Kg/h) of steam entering the steaming vessel;
Fp=flow rate (Kg/h) of polymer introduced at the top of the steaming vessel;
$\Delta T_{polymer}=T_{out}-T_{in}$ (° C.); and
K(° C.)$^{-1}$=multiplicative constant of the steam flow rate.

3. The method according to claim 2, wherein said control means comprise an advanced process controller (ACP) including a software able to calculate said value of $F_{steam}$ and a flow rate controller (FC) able to act on the opening of a control valve adjusting said flow rate $F_{steam}$.

4. The method according to claim 2, wherein said multiplicative constant K depends on the heat of condensation of steam at said temperature $T_{out}$ and on specific heat of the polymer.

5. The method according to claim 2, wherein said control means adjusts said flow rate of steam every N minutes, with N ranging from 0.1 to 10 minutes.

6. The method according to claim 2, wherein said outlet temperature $T_{out}$ is a pre-fixed reference temperature.

7. The method according to claim 1, wherein the polymer particles descend through said steaming vessel under "plug flow" conditions.

8. The method according to claim 1, wherein said inlet temperature $T_{in}$ ranges from 60 to 95° C.

9. The method according to claim 1, wherein said outlet temperature $T_{out}$ ranges from 90 to 115° C.

10. The method according to claim 1, wherein said polymer is a polyolefin.

11. The method according to claim 1, wherein said steam is under saturated conditions.

* * * * *